(Model.)

B. E. SHATTUCK.
Reversible Broiler.

No. 234,339. Patented Nov. 9, 1880.

Witnesses:
H. S. Talbot
W. R. Marble

Inventor:
Burt E. Shattuck
By Sylvenus Walker
Attorney

United States Patent Office.

BURT E. SHATTUCK, OF CAMBRIDGE, MASSACHUSETTS.

REVERSIBLE BROILER.

SPECIFICATION forming part of Letters Patent No. 234,339, dated November 9, 1880.

Application filed March 22, 1880. (Model.)

*To all whom it may concern:*

Be it known that I, BURT E. SHATTUCK, of Cambridge, in the county of Middlesex and State of Massachusetts, have invented certain new and useful Improvements in Reversible Broilers, of which the following is a specification.

The object of my invention is to provide means whereby the relative position of the handles to the clamp-frames for holding the food to be broiled may be reversed, so as to permit all portions of the same to be cooked alike or without over-cooking any part thereof; and it consists in hinging the handles one to each clamp-frame, at about mid-length of the same, so said handles may be folded together, inclosing one end of the clamp-frames, and when desired said handles may be reversed, so as to inclose the opposite ends of the clamp-frames, so as to permit first one end of the clamp-frames to be introduced within an opening of a stove, then the other end, as hereinafter more fully described and set forth.

Figure 1:
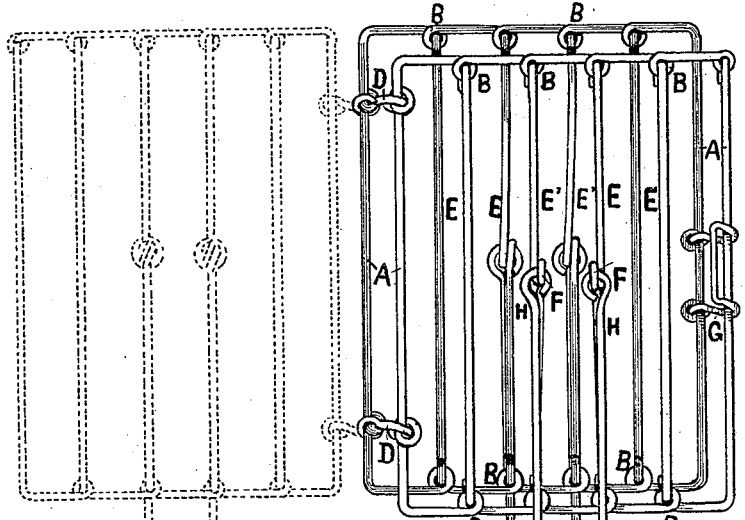
Figure 2:
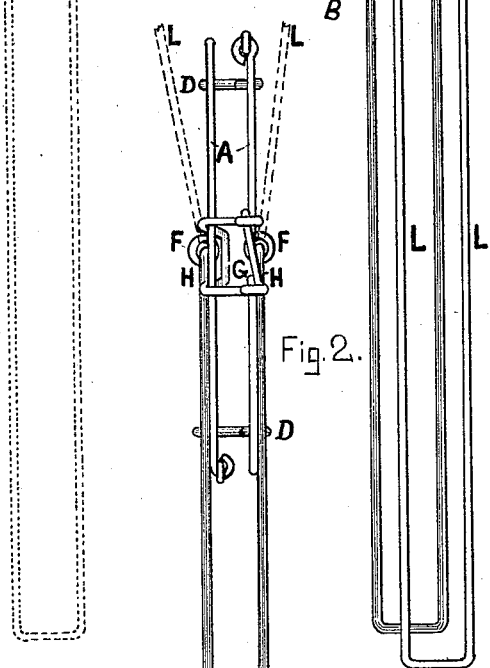

Figure 1 shows a perspective view of a broiler constructed according to my invention. Fig. 2 is an edge view of the same, showing the connection of the handles with the frames.

A A represent wires forming the outer portions of the clamp-frames, in which said wires A are bent so as to form eyes or loops B at short intervals across each end and also upon the sides for the hinges D and catch G. These are formed of wire and secured at one end to the said eyes upon the sides by a hook formed upon the ends of each, and which is passed through the eyes and bent down, so as to secure them in position, as shown in Fig. 1.

The parallel wires or bars E are formed with hooked ends, which are inserted into the eyes B at each end of the clamp-frames A and then bent over thereon, so as to secure them in position in a very thorough manner.

The two central bars, E', of each clamp-frame are provided with eyes F at about their center portions or at their mid-length, as shown, and extending outward or beyond the outer faces of the same, and into these eyes F are secured the inward ends, H, of the handles L, which are bent into form from suitable wire and provided with hooked ends, which are introduced within the said eyes F and then bent or turned down, so as to connect with the eyes somewhat loosely, thereby forming hinge-joints, which permit said handles L to be turned toward either end of the clamp-frames A, by which means food placed within the clamp-frames may be cooked evenly or equally at each end thereof, as, when sufficiently done at the farthest end from the handles, it is only necessary to turn the handles over or toward the opposite end where the food is done, thus bringing the uncooked into the same relative position, to be subsequently cooked by placing the end of the broiler in the opening of a stove, as heretofore.

I am aware that heretofore broiler-frames have been pivoted between their handles, so as to permit such frames to be rotated between such handles, and also am aware that broiler-frames have had their handles hinged to the opposite ends thereof. Therefore, I disclaim such inventions.

Having thus described my invention, what I claim is—

1. In a broiler, the outer wires forming the rectangular frames A, provided with eyes B, and the parallel bars E of said frames held permanently in position therewith, substantially as shown and described.

2. In a broiler, the handles hinged to the central portion of the clamp-frames, whereby said handles may be reversed or folded upon either end of the said clamp-frames, substantially as and for the purposes set forth.

BURT E. SHATTUCK.

Witnesses:
SYLVENUS WALKER,
H. S. TALBOT.